(12) United States Patent
Bhatia et al.

(10) Patent No.: US 10,672,024 B1
(45) Date of Patent: Jun. 2, 2020

(54) GENERATING FILTERS BASED UPON ITEM ATTRIBUTES

(71) Applicant: Amazon Technologies, Inc., Seattle, WA (US)

(72) Inventors: Sandeep Bhatia, Redmond, WA (US); Haroldo Jose Level, Seattle, WA (US); Mohamed Ershad Junaid, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 754 days.

(21) Appl. No.: 14/848,762

(22) Filed: Sep. 9, 2015

(51) Int. Cl.
*G06Q 30/00* (2012.01)
*G06Q 30/02* (2012.01)

(52) U.S. Cl.
CPC .................. *G06Q 30/0244* (2013.01)

(58) Field of Classification Search
None
See application file for complete search history.

(56) References Cited

U.S. PATENT DOCUMENTS

| | | | |
|---|---|---|---|
| 2003/0037041 A1* | 2/2003 | Hertz | G06Q 30/02 |
| 2012/0004975 A1* | 1/2012 | Satyavolu | G06Q 30/02 |
| | | | 705/14.27 |
| 2014/0279214 A1* | 9/2014 | Wagoner-Edwards | ......... |
| | | | G06Q 30/0633 |
| | | | 705/26.8 |
| 2015/0142555 A1* | 5/2015 | Zheng | G06Q 30/0241 |
| | | | 705/14.43 |

FOREIGN PATENT DOCUMENTS

| | | | | |
|---|---|---|---|---|
| EP | 1111922 A2 * | 6/2001 | ......... | H04N 21/4331 |
| GB | 2445053 A * | 6/2008 | ......... | H04L 67/2852 |
| WO | WO-2009143109 A1 * | 11/2009 | ............. | G06Q 30/02 |

OTHER PUBLICATIONS

Oracle. Little Blue Book: A Buyers Guide. (Dec. 2014). Retrieved online Jan. 23, 2020. http://www.bluekai.com/bluebook/assets_20150102/bluekai-little-blue-book.pdf (Year: 2014).*
Pawar, Amruta Vijay. Study of the Effectiveness of Online Marketing on Integrated Marketing Communication. (Nov. 2014). Retrieved online Jan. 23, 2020. (Year: 2014).*
Ekstrand et al. Collaborative Filtering Recommender Systems. (2010). Retrieved online Jan. 23, 2020. http://files.grouplens.org/papers/FnT%20CF%20Recsys%20Survey.pdf (Year: 2010).*

* cited by examiner

*Primary Examiner* — James A Reagan (74) *Attorney, Agent, or Firm* — Thomas | Horstemeyer, LLP (57) ABSTRACT

Disclosed are various embodiments of systems, methods, and computer programs that generate filters that can be used to filter offerings in a user interface. The effectiveness of filters can be evaluated to generate an effectiveness metric. The effectiveness metric can be used to weight the filters. The effectiveness metric can be based on a probability analysis of filters that are based on the probability that a filter was active when a transaction in the transaction history occurred.

21 Claims, 9 Drawing Sheets

GENERATING FILTERS BASED UPON ITEM ATTRIBUTES

BACKGROUND

In an electronic retail setting in which multiple sellers operate in a single electronic marketplace, more than one seller can offer an item for sale to customers. The item can include a physical or virtual item. The item can be listed in various offerings from various sellers at different prices and at different terms. For example, shipping terms can vary among different sellers. A shipping location of a seller can vary. Certain sellers may offer rebates or rewards to customers. Some sellers may include as a purchase term that the seller will donate an amount to one or more charities in exchange for the purchase of an item in an offering. Accordingly, customers have many options from which to choose when selecting a particular offering of an item in which they are interested.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Embodiments of the present disclosure relate to generating filters that can be applied to an offering user interface to filter offerings that are associated with an item. In an electronic retail setting or in a setting in which multiple options associated with an item are presented, filters can be helpful to assist users with finding an offering associated with an item. For example, in a retail setting, a user can filter various offerings from various sellers in a multi-seller environment to arrive at a particular offering from a particular seller that is preferred by the user. The offering selected by the user is generally associated with various attributes. Attributes can include, for example, shipping terms, sales or value-added taxes associated with the offering, price, and other terms of a sale. Attributes can also include information about the seller, such as a location of the seller or a location from which the item will be shipped, a shipping turnaround time promised by the seller, a seller satisfaction rating, or other attributes about a seller that may matter to users. Attributes can further include additional terms of a sale that might be relevant to a user, such as rebate offers, rewards offered in exchange for a sale, or other incentives that might be desired or relevant to a seller.

Figure 1A:
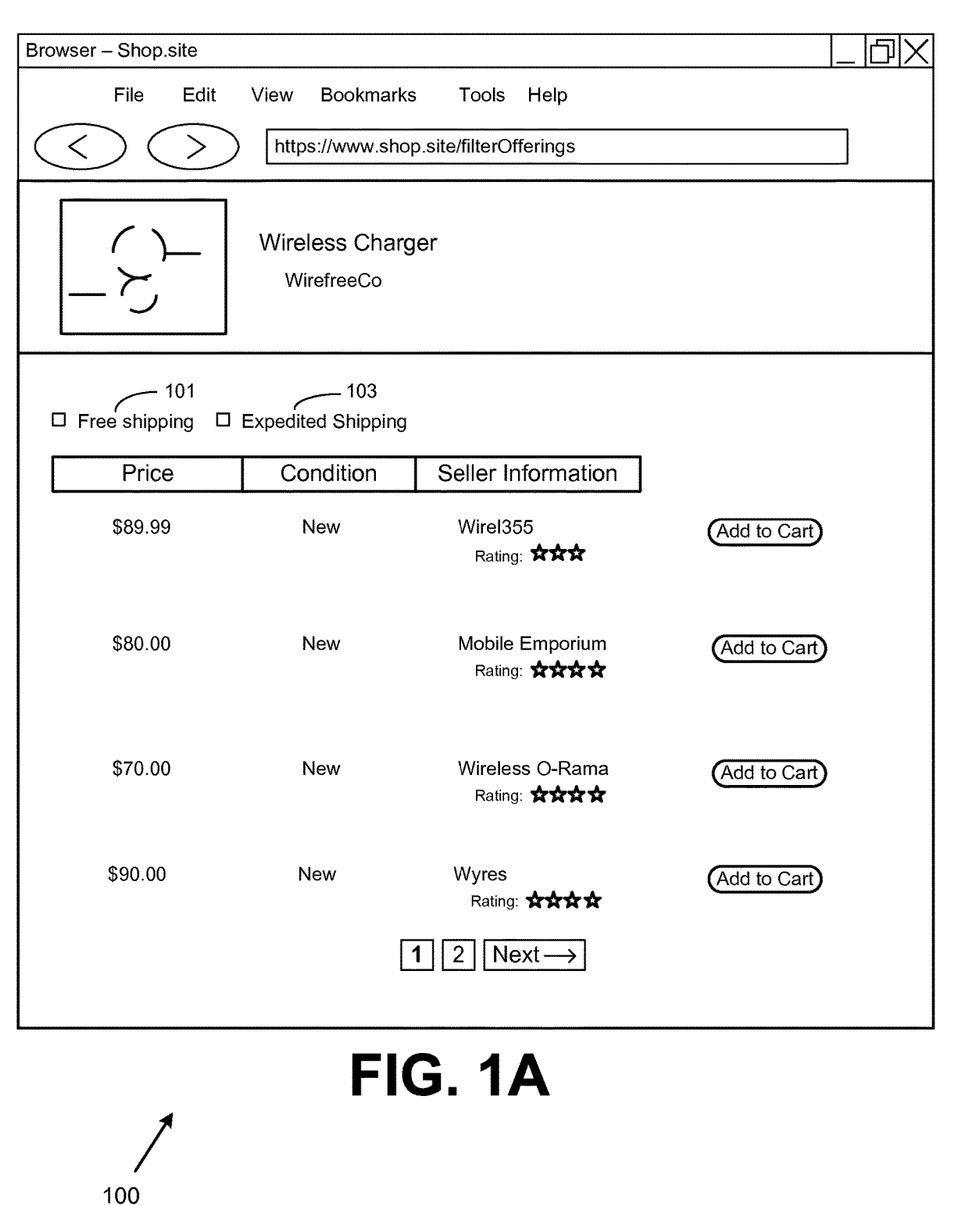
FIG. 1A-1B are drawings is a drawing of an example of a user interface according to an embodiment of the present disclosure.

In a large multi-seller electronic marketplace, it can be difficult for a user to locate a particular offering for an item desired by users that include the best possible combination of attributes according to the user's interests and desires. Many user interfaces that allow a user to browse offerings include filters that an operator of the marketplace might consider applicable to a broad population of users. For example, referring to FIG. 1A, shown is an example offering filter user interface 100 that incorporates filter 101 and filter 103 that can be employed by a user to filter the offerings for an item. The example filters 101 and 103 allow the user to filter the offerings for an item by their shipping terms. In some user interfaces, the filters 101 and 103 are used when displaying offerings for any type of item and regardless of the user's identity when viewing the offerings.

Figure 1B:
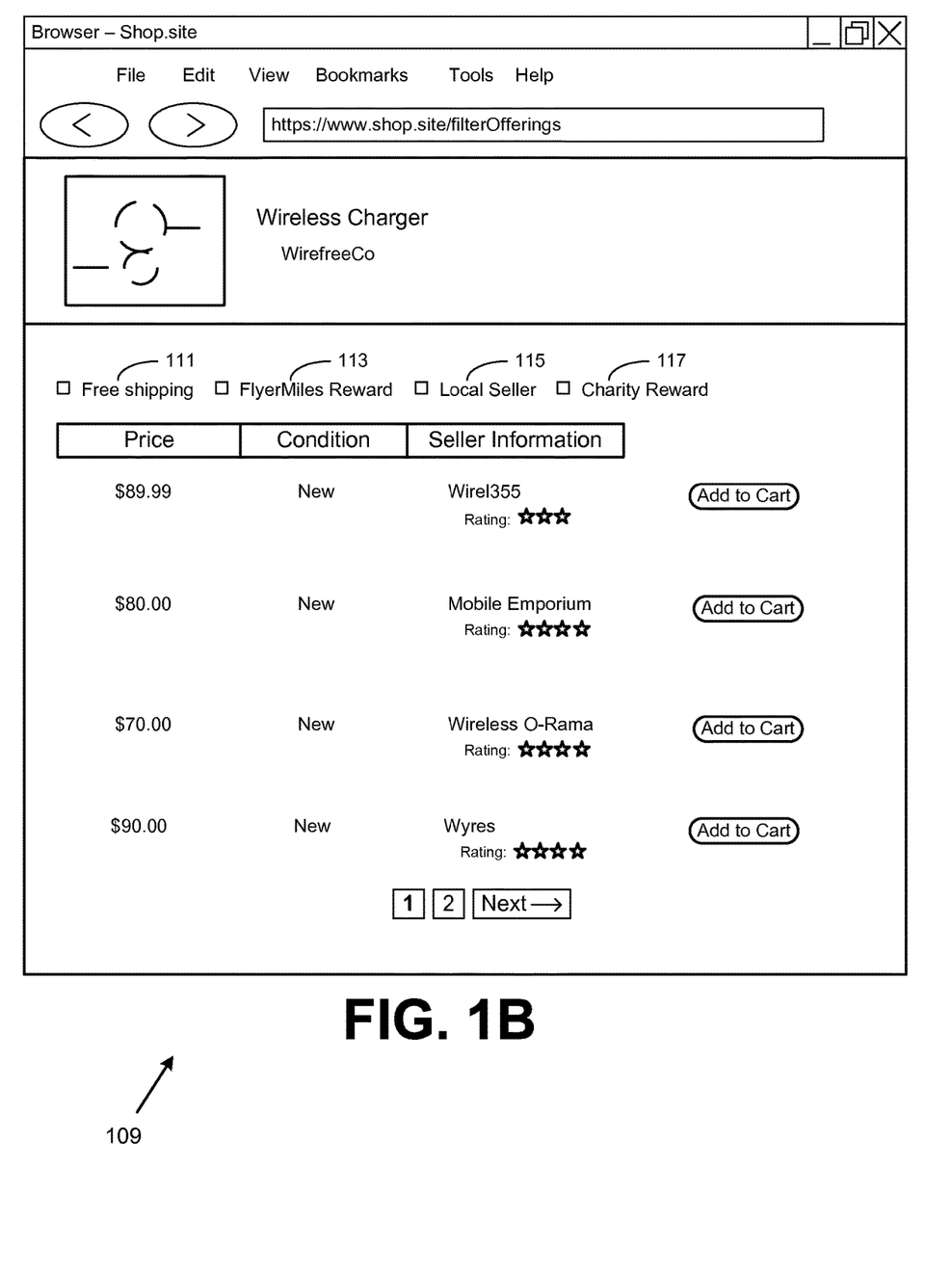

In contrast, as shown in FIG. 1B, the offering filter user interface 109 generating according to examples of the disclosure includes additional filters 111, 113, 115 and 117. The filters are generated based upon an analysis of attributes that are linked with offerings of the item in the electronic marketplace. In this sense, any attribute of an offering, as described above, can be converted into a filter than can be used in the offering filter user interface 109. However, converting any and all attributes of an offering to a filter may result in a very large number of filters in the offering filter user interface 109. Accordingly, identifying those filters that have the most utility for particular products or users can have a great deal of value. To this end, over time, the effectiveness of filters that are created and placed into a user interface is judged. A filter can be weighted based upon its effectiveness and whether it is placed into an offering filter user interface 109 can be determined based on this weighting as well as other factors.

A particular filter can also be selected and placed into an offering filter user interface 109 based upon an analysis of a user who is requesting the offering filter user interface 109. An analysis of the transaction or purchase history of the user is performed and appropriate filters to include in the user interface are selected based upon this analysis. The filters shown in the example of FIG. 1A can be generated and placed into the offering filter user interface 109 in various ways according to examples of this disclosure as described herein.

Figure 2:
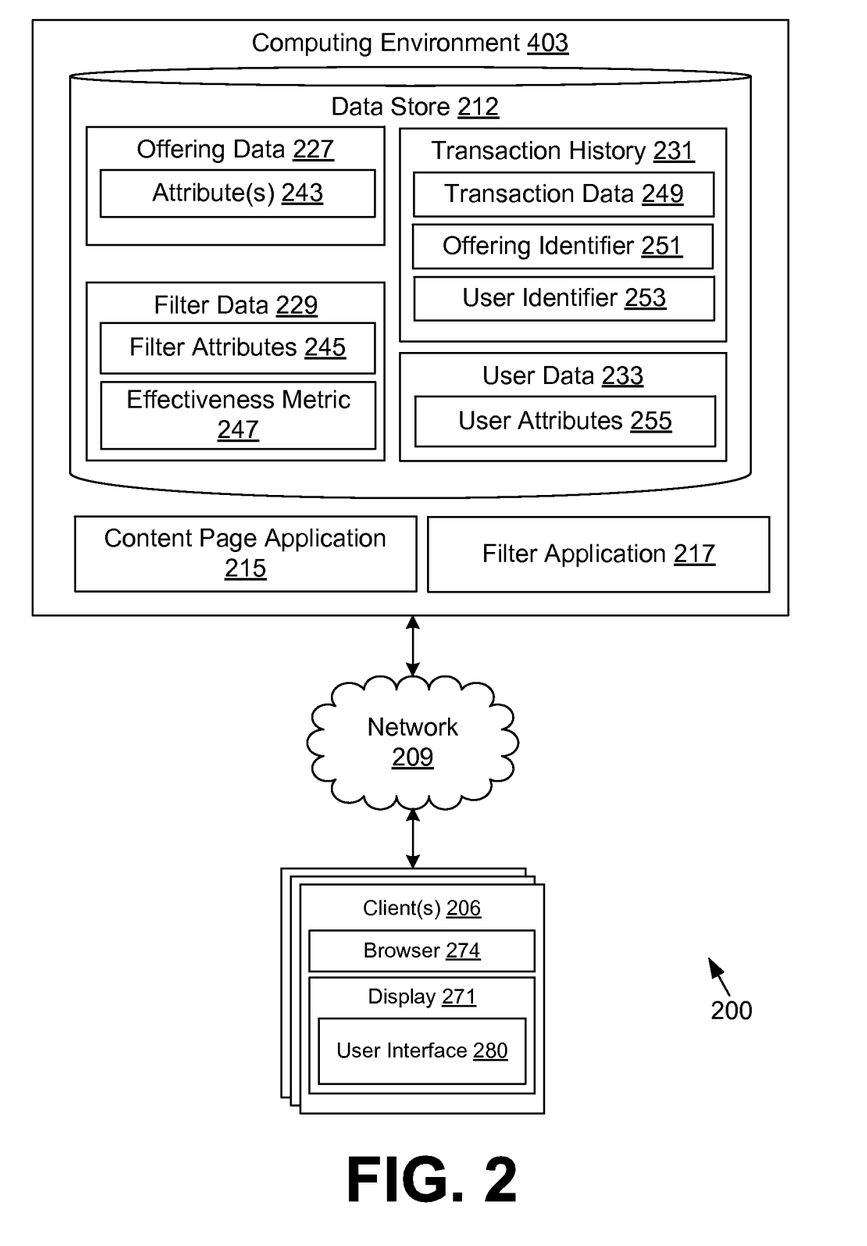
FIG. 2 is a drawing of a networked environment according to an embodiment of the present disclosure.

With reference to FIG. 2, shown is a networked environment 200 according to various embodiments. The networked environment 200 includes a computing environment 203 and a client 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality can be executed in the computing environment 203 according to various embodiments. Also, various data is stored in a data store 212 that is accessible to the computing environment 203. The data store 212 may be representative of a plurality of data stores 212 as can be appreciated. The data stored in the data store 212 for example, is associated with the operation of the various applications and/or functional entities described below.

The components executed on the computing environment 203, for example, include the content page application 215 and filter application 217. The content page application 215 is executed to generate content pages or user interfaces that are transmitted to a client 206 associated with a user. For example, a user can navigate to a site implemented by the computing environment 203 can initiate a request to view a page of the site, such as a home page of any other page of the site. The user can click or tap on a link rendered by a browser executed on the client 206 that generates a request to view an offering filter user interface for an item, where the user can browse various offerings for a particular item and potentially activate filters that appear in the user interface to filter these offerings. The offering filter user interface can be generated to display offerings for an item available in an electronic catalog or in any context in which multiple options can be displayed that are linked to a particular item.

In some examples, the computing environment 203 can execute an electronic commerce system that performs various backend functions associated with the online presence of an organization to facilitate the online purchase of the items. For example, the electronic commerce system can generate network pages or portions thereof that are provided to clients 206 for the purposes of selecting items for purchase, rental, download, lease, or other forms of consumption. However, examples of this disclosure are not limited to retail scenarios, though the examples presented herein are presented in a retail context for an ease of understanding and depiction.

The filter application 217 can generate filters that can be placed in an offering filter user interface or in content pages that are generated by the content page application 215 in response to a request on behalf of a user to view content generated by the content page application 215. The filter application 217 can also evaluate filters that are used for placement in content pages generated by the content page application 215. The effectiveness of a filter can be evaluated by generating an effectiveness metric, which can be used to weight filters. A filter that is weighted according to a strong effectiveness metric is more likely to be included in a content page generated by the content page application 215 than a filter that is linked with a weak effectiveness metric. In the depicted example of FIG. 2, the filter application 217 is being executed remotely from the client 206. However, the filter application 217 can also be executed by the client 206 or on a device other than in a client-server model in order to judge the effectiveness of filters as well as assist with placement of filters in a user interface.

The data stored in the data store 212 includes, for example, offering data 227, filter data 229, a transaction history 231 and user data 233. The offering data 227 includes data used to describe each offering of an item in an item catalog. An item can include an item that is available for sale in an electronic commerce system, a search result generated by a search engine, an item in an item catalog, or any other type of item for which various offerings or options can be presented. Offering data 227 can include, for example, a seller identifier 241 and attributes 243. Attributes 243 can include information about an item with which an offering is linked, such as an item title, item description, item price, item quantity, item options, item number, item images, and/or other data. Attributes can also include terms associated with a sale of an item, such as a tax rate, shipping cost, or whether a sale of the item is associated with rewards, rebates or other incentives for a purchaser.

For example, the purchase of an item can result in a donation to a particular charity or a cash back reward to the user. The purchase of an item can also result in purchase credits for other items in a marketplace or reward points or miles for a user in return for the purchase. These rewards, rebates or incentives can be identified as attributes 243 that are associated with the offering. Attributes can also include any data type that is or could be associated with an item, either directly, or from feedback, ratings, or other structured or unstructured data sources.

Filter data 229 includes data regarding filters that can be generated by the filter application 217 and incorporated into an offering filter user interface by the content page application 215. Filter data 229 can identify one or more filter attributes 245. Filter attributes 245 can correspond to attributes 243 that are associated with offerings of items. For example, if an offering is associated with free shipping in a retail context, a filter attribute 245 can also identify free shipping as an attribute by which offerings can be filtered. As another example, if an offering is associated with a cashback reward to a purchaser as an attribute 243, an indication of a cashback reward can be a filter attribute 245.

A particular filter, in some scenarios, can be associated with a combination of more than one filter attributes 245. For example, a filter can identify free shipping and the existence of a cashback reward as filter attributes 245. Applying such a filter would filter out those offerings that are not associated with both attributes 243. A filter can also include an attribute of a particular offering, such as a color, size, or any other descriptive attribute. In this sense, a filter need not be a construct that removes offerings from a user interface in which offerings are presented. A filter can also represent a descriptive attribute that describes some portion of a number of offerings.

The effectiveness metric 247 includes a score that can be calculated by the filter application 217 that represents the effectiveness of a filter in assisting users to find a particular offering of an item. The effectiveness metric 247 can be generated in various ways, as will be described below. In one scenario, the effectiveness metric 247 can be based upon a Bayesian probability that a particular filter was active when a transaction occurred. In another scenario, the effectiveness metric can be based upon an analysis or count of transactions in a transaction history 231 that can be linked to a transaction from the transaction history 231. One formula that can be used to calculate an effectiveness metric 247 is discussed in more detail below. In general, the effectiveness metric 247 incorporate any user engagement metrics or data that can assist with judging how effective or useful a particular filter is for a population of users of a site.

In some examples, an effectiveness metric 247 can be generated for a particular filter with respect to individual users. In this way, the set of filters housed in the data store 212 can be associated with an effectiveness metric 247 for individual users. In another example, the set of filters housed in the data store 212 can also be scored to evaluate their effectiveness with respect to a population of users.

The transaction history 231 represents a history of transactions that are housed in the data store 212 and from which filters can be generated and evaluated. Transactions can represent purchase transactions that are made by users of an electronic commerce site, searches made by users of a search engine, interactions in a social networking system, or any other events that can be tracked or catalogued with respect to users.

Transaction data 249 can include data related to a particular transaction. The transaction data 249 can identify an item that was purchased in a transaction, a timestamp associated with the transaction, a search query associated with the transaction, an electronic storefront in which the transaction occurred, pricing data, shipping terms or other purchase terms associated with the transaction, or any other terms that can be archived with respect to a transaction. The transaction data 249 can also include any other contextual information with respect to a particular transaction, such as a time of day, a time of year, or season. Such contextual information can also be thought of as an attribute that can be converted into a filter by the filter application 217.

A transaction can also be associated with an offering identifier 251. The offering identifier 251 identifies the offering from which a particular transaction occurred. For example, the offering identifier 251 for a purchase transaction identifies the particular offering from which the purchase transaction occurred. In this way, the filter application 217 can relate purchases of an item to a specific seller offering. Similarly, the user identifier 253 identifies a user associated with a transaction. For example, the user can be a purchaser in the context of an electronic retail transaction. Because the transaction history 231 relates a particular offering and user to a transaction, the filter application 217 can determine the attributes that are in turn associated with an offering and with the transaction.

User data 233 is any data that is associated with a user account in the computing environment. A user account can be associated with one or multiple users. For example, a user can include a single user, a family of four individual users, a small entity of twenty individual users, etc. The user can also be associated with a particular client 206. In this regard, the client 206 may be registered as a device associated with the user data 233. The user data 233 can further include user attributes 255. User attributes 255 can include, for example, attributes such as user credentials, a purchase history, a browse history, a wish list, payment information, contact information, or any other data that might be necessary to maintain with respect to a user account.

The client 206 is representative of a plurality of client devices that may be coupled to the network 209. The client 206 can include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 271. The display 271 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 206 may be configured to execute various applications such as a browser 274 and/or other applications. The browser 274 may be executed in a client 206, for example, to access network content served up by the computing environment 203 and/or other servers, thereby rendering a user interface 280 on the display 271. To this end, the browser 274 may comprise, for example, a browser, a dedicated application, etc., and the user interface 280 may comprise a network page, an application screen, etc. In particular, the user interface 280 can include an offering filter user interface and include information about offerings related to an item. The client 206 may be configured to execute applications beyond the browser 274 such as, for example, email applications, social networking applications, word processors, spreadsheets, and/or other applications.

Next, a general description of the operation of the various components of the networked environment 200 is provided. The filter application 217 can generate filters that are stored in the data store 212 and that can be included in an offering filter user interface. The filter application 217 can also evaluate the effectiveness of filters employed in content pages by calculating an effectiveness metric of the filter. The content page application 215 can generate a user interface that includes filters that are created by the filter application 217 based upon the effectiveness metric for that filter, a context in which the filter might be used, and an identity of a user for whom a particular content page is being generated.

To create filters, the filter application 217 can analyze attributes 243 that are associated with offerings in the data store 212. In one scenario, the filter application 217 can perform a statistical or mathematical analysis on attributes 243 of offerings for an item as well as a population of previous transactions from the transaction history 231 for the item. In one scenario, the filter application 217 can first cull the attributes 243 that are associated with the various offerings of an item based upon a relevance analysis. In one example, an editorial decision can be made by an administrator that certain attributes 243 should be not considered when performing an analysis of attributes 243 to consider for creation of new filters. In another example, a relevance algorithm can rank attributes with respect to relevance to the item, and the filter application 217 can select the top N attributes based on the relevance analysis for consideration as a part of a newly created filter. The relevance algorithm can judge similarity based upon a textual similarity of attributes with respect to textual information that is housed in the offering data 227 for a particular item.

Next, the filter application 217 can identify attributes 243 that are associated with offerings in the transaction history 231 as well as the attributes 243 of offerings that are not in the transaction history 231. In other words, in one example, the filter application 217 can identify attributes 243 that are associated with purchased offerings and attributes 243 that are associated with unpurchased offerings in the transaction history 231.

In one scenario, the filter application 217 can perform a decision tree analysis to identify attributes, if employed as filters, that would have assisted a user in arriving at an offering that interests them, or results in a purchase transaction. In one example, the filter application 217 can perform an information gain analysis on one or more of the attributes 243 and the transaction history 231, wherein the analysis computes an information gain of an attribute 243 in offerings that were purchased against offerings that were unpurchased. Those attributes having the highest information gain can be selected as filters. In other words, the content page application 215 can use these attributes 243 that are selected as filters in an offering filter user interface.

The information gain analysis can also be performed on pairs of attributes 243 or combinations of any number of attributes.

The filter application 217 can also analyze the effectiveness of filters that are available in the data store for inclusion in an offering filter user interface by the content page application 215. In one scenario, the filter application 217 can calculate the effectiveness metric 247 associated with a filter by calculating a probability for filter effectiveness. As one example, the probability can include a probability that a particular filter, which can be a combination of one or more filter attributes 245 was active for a particular transaction in the transaction history 231. The probably can also be a Bayesian probability.

The probability can be calculated according to the following equation:

$$p_{filter} = \frac{p_t \times p_a}{p_o}$$

In the above equation, $p_{filter}$ filter represents the probability that a particular filter was active when a transaction in the transaction history was made; $p_t$ represents the probability that a particular offering was purchased while the filter was active in an offering user interface, $p_a$ represents the standalone probability of the filter being active at any point in time, and $p_o$ represents the standalone probability that a particular offering is purchased by any user. $p_o$ can de deduced from a number of purchases of an offering of an item relative to all purchases of the item.

The probability that an offering was purchased while the filter was active and the standalone probability of a filter being active can be judged using data that can be tracked with respect to user activity of a site. For example, the following data can be determined by tracking user activity: the number of times a user or users visited a particular page, the number of times a user interface element, such as a filter element, was displayed on the page, the number of times a page view resulted in a purchase decision, the number of times users interacted with the various filter elements on a page, and other behavioral data with respect to users.

In one example, the probability that a filter was active and the probability that a filter was selected in a set of page views can be determined as the ratio of the number of times the filter was active to the total number of page views for a particular offering. The probability that a particular offering was purchased while the filter was active in an offering user interface can be determined by calculating a ratio of the number of times filter was active when a purchase decision was made to the number of times the offer was purchased. For example, an analysis of the transaction history 231 can be performed to determine whether a particular filter was active or not when a particular transaction occurred. By analyzing individual transactions in the transaction history 231, individual transactions may indicate whether a particular filter was active when the transaction occurred.

The probability that a particular offering will be purchased for a newly created filter can be determined by determining a ratio of the number of times an offer is in the top n offers after application of the filter to a number of times the offer is in top n offers after application of filter added to a number of times the offer is not in top n offers after application the of filter. In this scenario, n could be a configurable threshold.

Calculating an effectiveness metric 247 of filters can be an offline background process, as it relies upon an analysis of a population of transactions that can be located in the transaction history 231. In some examples, calculating the effectiveness metric 247 using the above probabilities can be effective or necessary in situations where the transaction history 231 does not specifically reflect whether a particular filter was active when a transaction occurred.

The effectiveness metric 247 can also be generated in other ways. For example, the effectiveness of a filter can be generated by counting a number of transactions in the transaction history 231 that can be associated with the filter or a filter attribute 245 of the filter. In other words, the filter application 217 can calculate a transaction count that can be traced to when the filter was active in an offering filter user interface.

Figure 3:
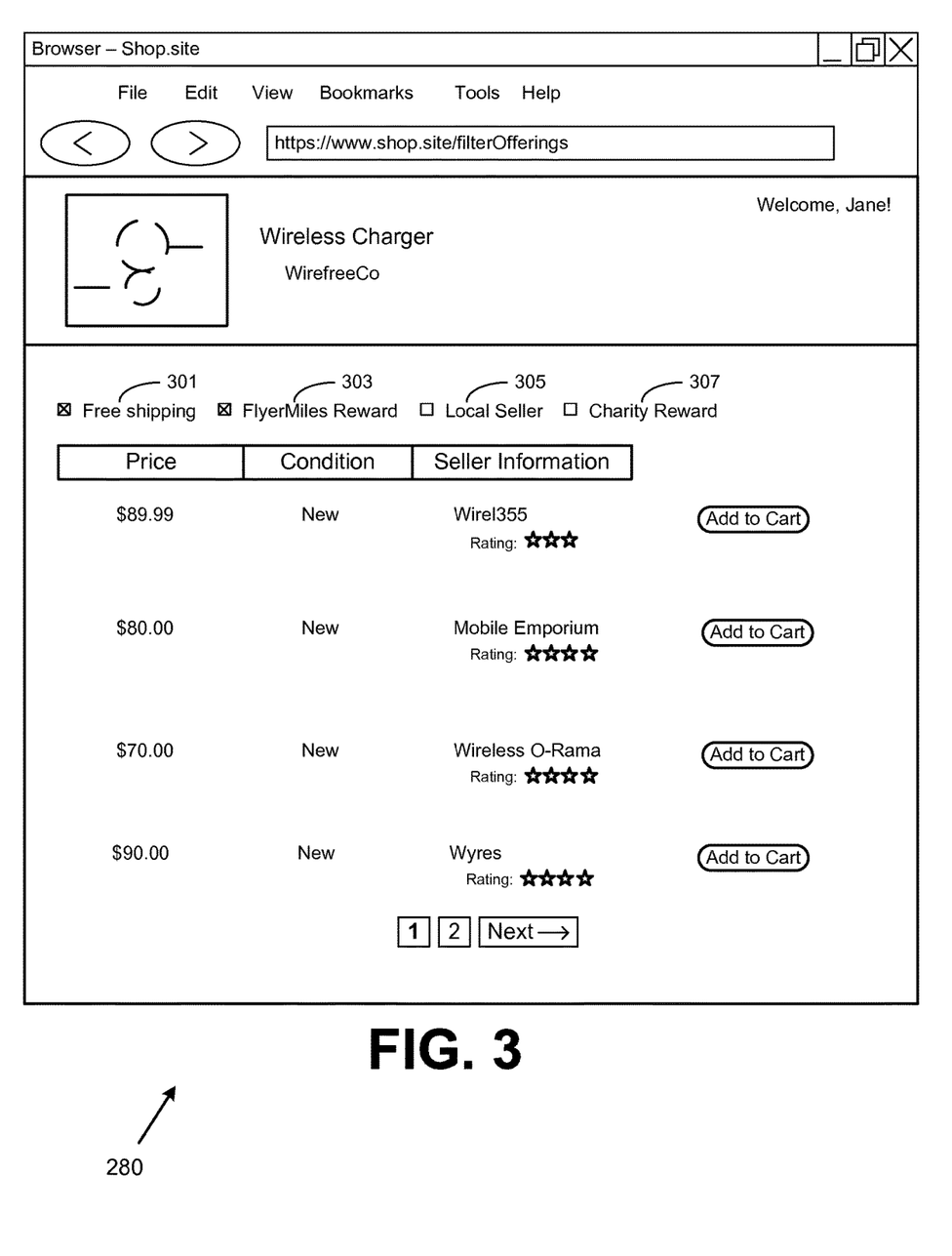
FIG. 3 is a drawing of an example of a user interface according to an embodiment of the present disclosure.

The content page application 215 can assemble content pages, such as those that include an offering filter user interface, in response to a request that is generated on behalf of a user for such a page. Accordingly, referring to FIG. 3, shown is a drawing of an offering filter user interface according to various examples of this disclosure. The offering filter user interface can be generated by the content page application 215 by identifying filters that should be included in a content page generated on behalf of a user.

The content page application 215 can take into account factors related to the effectiveness metric 247 of the various filters that have been generated by the filter application 217 and that are applicable to the offerings that are available for the item shown in the user interface 280. For example, a subset of the filters having the highest or best effectiveness metric 247 or where the metric meets a predefined threshold can be included in an offering filter user interface. In some examples, the content page application 215 can limit its selection of filters into a user interface by quantity. For example, a particular page may only have space to include four filters into the user interface. Accordingly, the content page application 215 can include the four filters associated with the highest effectiveness metric 247.

In some scenarios, content page application 215 can employ a probabilistic model for selection of filters based on the effectiveness metric 247. In this scenario, filters are weighted by their effectiveness metric 247 and selected by the content page application 215 for inclusion in a content page according to the weighting. For example, a filter with an effectiveness metric 247 that represents twice the effectiveness than another filter can be selected by the content page application 215 twice as often for inclusion in a content page. However, the content page application 215 can still ensure that the less effective filter is occasionally chosen for selection so that its ongoing effectiveness can continue to be judged by the filter application 217.

In one example, the content page application 215 can also take into account the identity of the user, or the user account associated with a request to generate the user interface 280, when generating the content page. To further discuss how the content page application 215 can generate a user interface 280 according to various embodiments, reference is now made to FIG. 3. FIG. 3 shows a drawing of a user interface 280 that incorporates filters 301-307 that are identified by the content page application 215. The filters 301-307 are identified from the data store.

In one scenario, the content page application 215 can be configured to select a predetermined number of filters to include in the user interface 280. For example, a user interface design of the page may dictate that no more than four filters can be selected for inclusion in the page. Accordingly, the content page application 215 can select filters based upon the identity of the user requesting the page and/or the effectiveness of filters as determined by the filter application 217.

In one scenario, the filters 301-307 can be selected by determining whether the filter attributes 245 corresponding to the filter are associated with a transaction in the transaction history of a user. In other words, if a filter attribute 245 corresponds to an attribute of an offering that was previously purchased by a user, the filter can be selected for inclusion in the user interface 280. Additionally, if the user has repeatedly purchased offerings that have a particular attribute, the content page application 215 can weight this behavior accordingly. For example, if the user has repeatedly purchased offerings that are associated with a cashback reward, the content page application 215 can select such an attribute for inclusion in the user interface. In this way, attributes in the user's transaction history 231 can be weighted by a quantity of purchases that can be associated with the attributes 243.

Additionally, certain filters can be preselected upon generating the page if the effectiveness metric 247 associated with the filters meets an even higher predetermined threshold or if the user's transaction history 231 reflects a very strong user preference for a particular filter. As shown in the example of FIG. 3 filters 301 and 303 have been preselected.

Accordingly, in the example of FIG. 3, the content page is generated on behalf of a particular user, known as "Jane." Filters 301-307 are selected by taking into account the transaction history that can be associated with the user Jane and the effectiveness metric 247 of filters in the data store 212. In certain scenarios, based upon an analysis of a particular user's transaction history, the filter application 217 can determine that the user prefers a particular filter for a large percentage of transactions or different filters in connection with different categories of transactions. Accordingly, the filter application 217 can select and even preselect filters based upon such an analysis of the user's transaction history 231.

Figure 4:
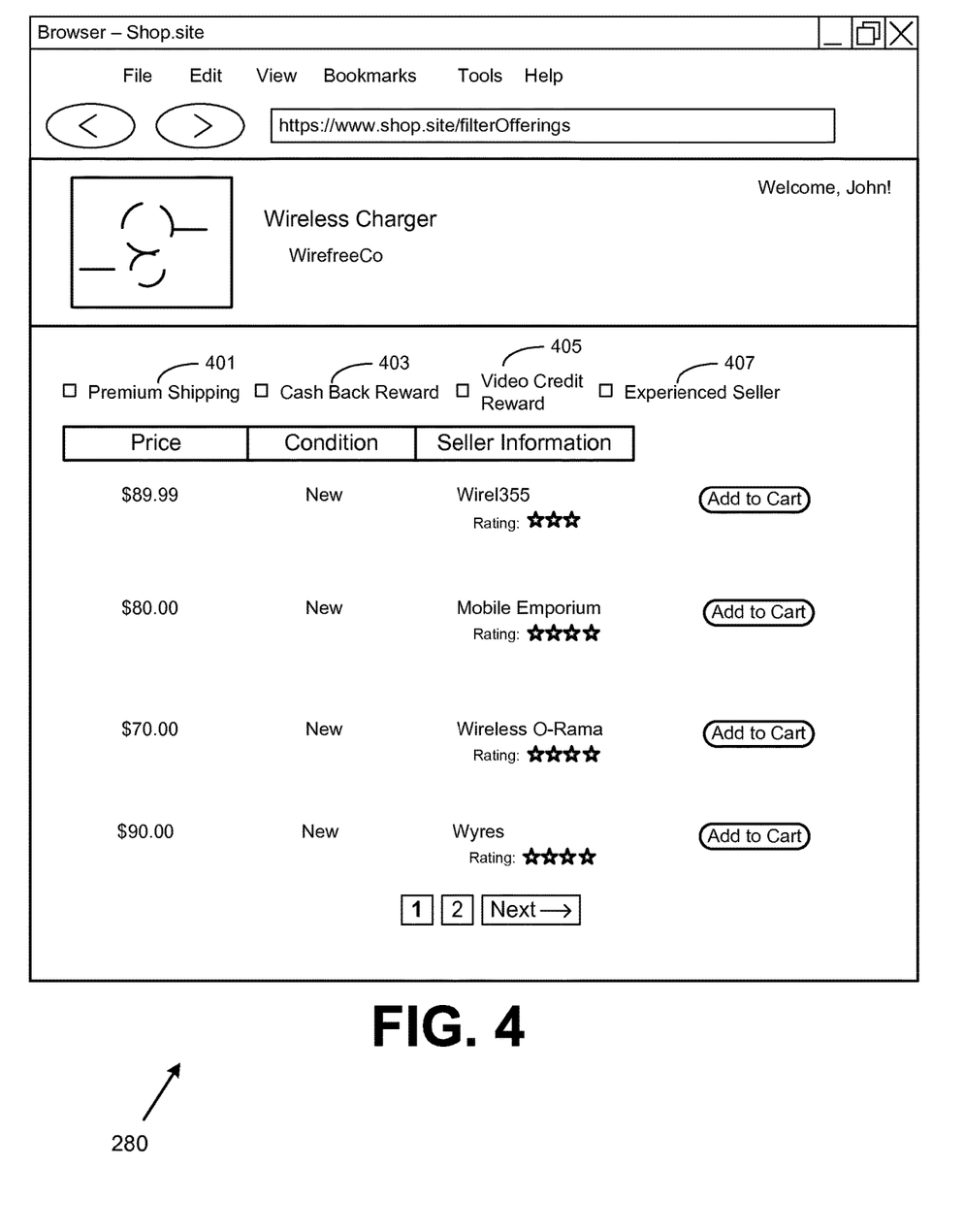
FIG. 4 is a drawing of an example of a user interface according to an embodiment of the present disclosure.

In contrast, referring to the user interface 280 shown in FIG. 4, the offering filter user interface shown has been generated for a different user than the user interface 280 shown in FIG. 3. Accordingly, the user interface 280 in FIG. 4 includes filters 401-407 that are different from the filters 301-307 shown in FIG. 3. As discussed above, the content page application 215 can select filters according to their effectiveness metric 247 using a probabilistic model, where highly weighted and effective filters are selected more often that less effective filters, but less effective filters can still be chosen. Additionally, the filter application 217 can be continually monitoring and adjusting the effectiveness metric 247 of a according to an embodiment of the disclosure. Finally, one or more of the filters 401-407 can be selected based upon whether a transaction history that is associated with the user requesting the page is associated with a particular attribute corresponding to the filter.

In some examples, the user interface 280 can also highlight certain offerings that satisfy the most number of filters that are presented in the user interface 280. In one example, if a filter is associated with an effectiveness metric 247 that meets a particular threshold, the offerings that match the filter can be highlighted, ranked, or reordered within the user interface. As another example, offerings can be color coded with filters within the user interface 280 so that a user can visually identify offerings that match a particular filter by color.

Figure 5:
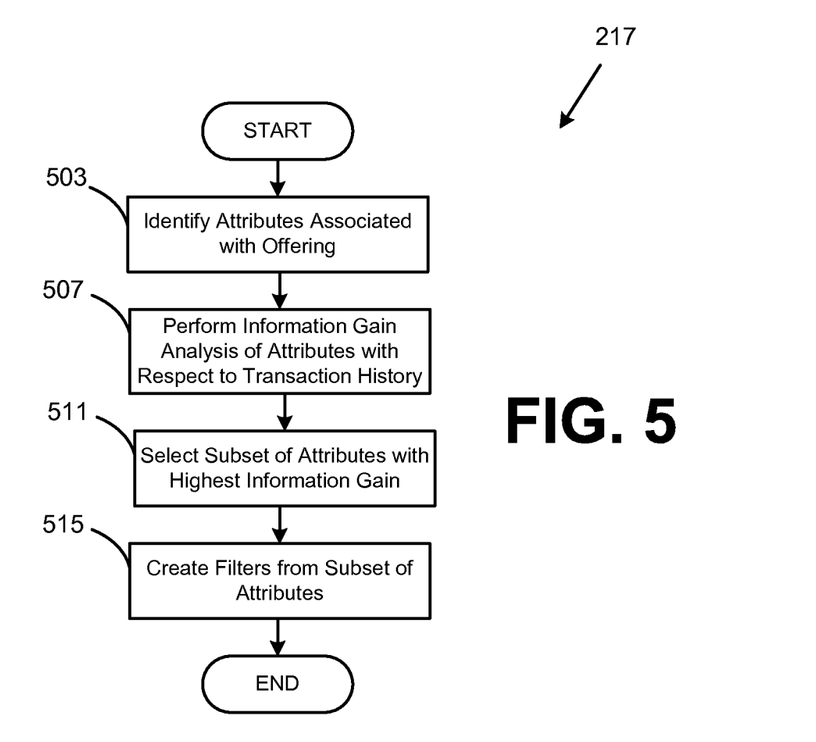
FIGS. 5-7 are flowcharts that provide examples according to an embodiment of the present disclosure.

With reference to FIG. 5, shown is a flowchart that provides one example of the execution of the filter application 217. Alternatively, FIG. 5 shows steps of a method implemented in the computing environment. FIG. 5 illustrates an example of the filter application 217 creating filters based upon an analysis of the transaction history 231 of a population of users. Accordingly, at box 503, the filter application 217 can identify attributes 243 that are associated with an offering in the data store 212. At box 507, the filter application 217 can perform an information gain analysis on one or more of the attributes 243 and the transaction history 231, wherein the analysis computes an information gain of an attribute 243 in offerings that were purchased against offerings that were unpurchased. Those attributes having the highest information gain 243 can be selected as filters at box 511. In other words, the content page application 215 can use these attributes 243 that are selected as filters in an offering filter user interface. The information gain analysis can also be performed on pairs of attributes 243 or combinations of any number of attributes. At box 515, the filter application 217 can create filters from the attributes exhibiting the highest information gain from the information gain analysis.

Figure 6:
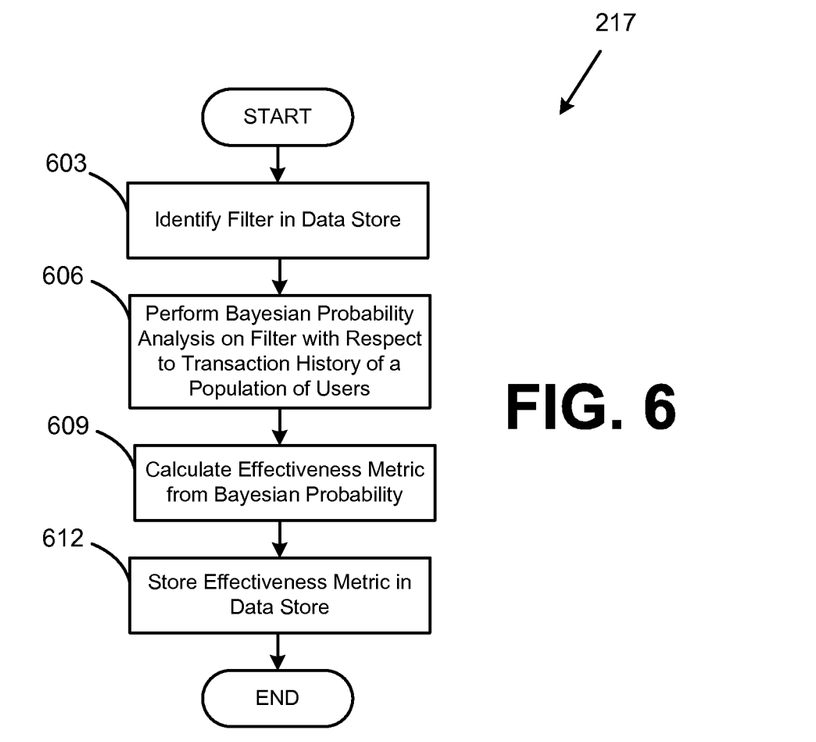

With reference to FIG. 6, shown is a flowchart that provides one example of the execution of the filter application 217. Alternatively, FIG. 6 shows steps of a method implemented in the computing environment. FIG. 6 illustrates an example of the filter application 217 evaluating filters based upon an analysis of the transaction history 231 of a population of users. At box 603, the filter application 217 can identify a filter in the data store 212. At box 606, the filter application 217 can perform a Bayesian probability analysis on the filter with respect to the transaction history 231 of a populations of users for items in the data store 212. As noted above, the probability analysis generates a probability of a filter being active when a particular transaction occurred. At box 609, the filter application 217 calculates an effectiveness metric 247 based upon the probability that was calculated at box 606. At box 612, the effectiveness metric 247 is stored in association with the filter in the data store 212. The effectiveness metric 247 can be used as a weighting mechanism to weight the filter in some embodiments. The weighting can be taken into account by the content page application 215 when a filter is selected for inclusion in a user interface 280.

Figure 7:
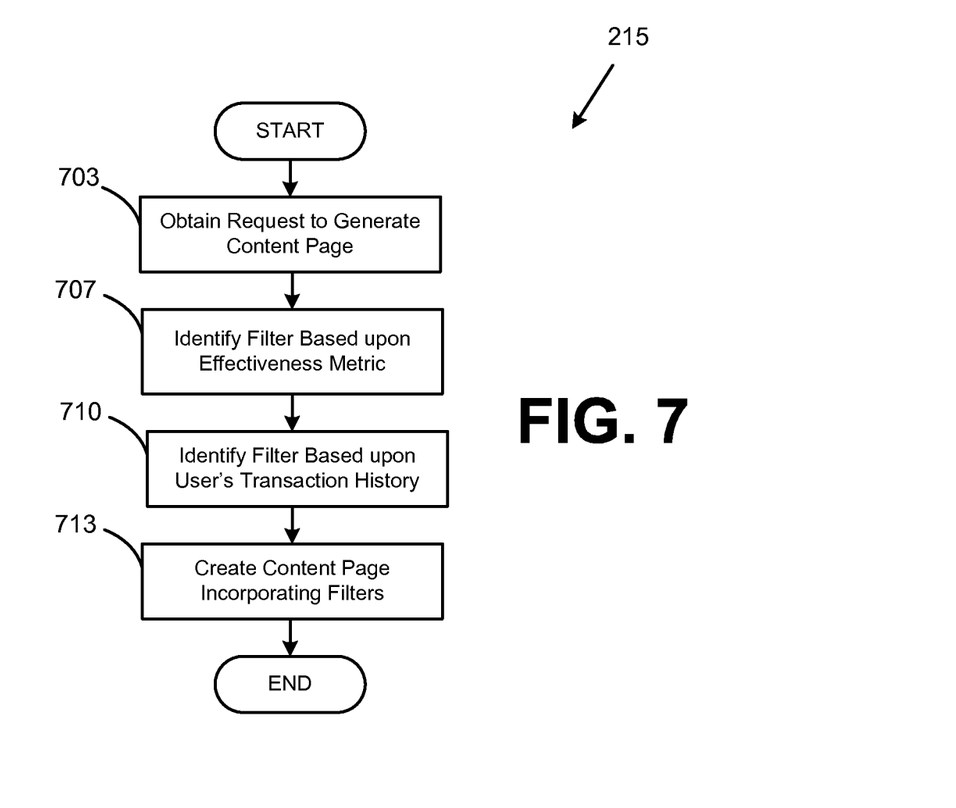

With reference to FIG. 7, shown is a flowchart that provides one example of the execution of the content page application 215. Alternatively, FIG. 7 shows steps of a method implemented in the computing environment. FIG. 7 illustrates an example of the content page application 215 selecting filters for inclusion in an offering filter user interface. At box 703, the content page application 215 can obtain a request to generate a content page or an offering filter user interface for a particular item. At box 707, the content page application 215 can identify a filter in the data store 212 that is associated with the item. At box 710, the content page application 215 can identify a filter based upon the transaction history of the user. In other words, the content page application 215 can determine whether a filter attribute 245 of a filter corresponds to an attribute that can be associated with the user in the transaction history 231. At box 713, the content page application 215 can generate a content page incorporating the selected filters. The filters can be selected for inclusion into the content page using a scoring system that takes into account how heavily weighted a particular filter is with respect to its effectiveness rating 243 as well as how heavily weighted a particular filter is with respect to the occurrence of a filter attribute 245 of the filter in the transaction history 231 associated with the user.

Figure 8:
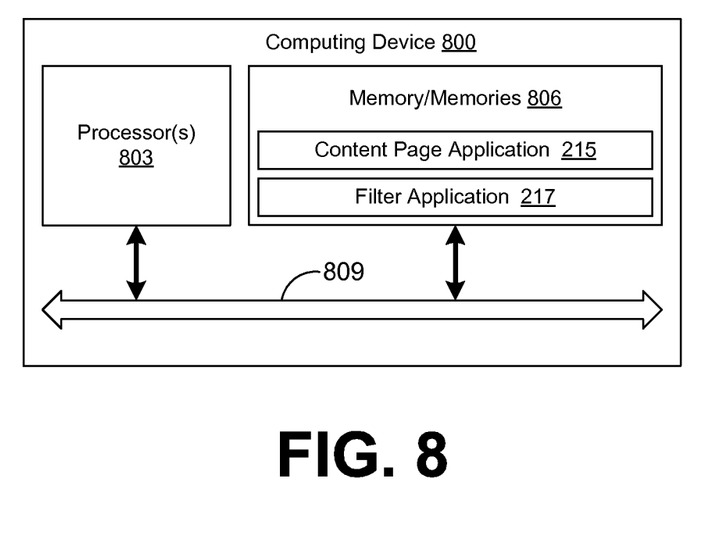
FIG. 8 is a block diagram of one example embodiment of a computing environment according to an embodiment of the present disclosure.

With reference to FIG. 8, shown is a schematic block diagram of the computing environment 203 according to an embodiment of the present disclosure. The computing environment 203 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the content page application 215, filter application 217, and potentially other applications. Also stored in the memory 806 may be a data store 212 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the content page application 215, filter application 217, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6-7 show the functionality and operation of an implementation of portions of the content page application 215 and filter application 217. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 6-7 show a specific order of execution, it is understood that the order of execution may differ from that which is depicted. For example, the order of execution of two or more blocks may be scrambled relative to the order shown. Also, two or more blocks shown in succession in FIGS. 6-7 may be executed concurrently or with partial concurrence. Further, in some embodiments, one or more of the blocks shown in FIGS. 6-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content page application 215 and filter application 217, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content page application 215 and filter application 217, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing environment 203 or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described the invention, at least the following is claimed:

1. A method comprising:
    identifying a plurality of offerings associated with an item available through an electronic commerce site, the electronic commerce site facilitating a multi-seller environment, wherein the offerings are each associated with a respective plurality of attributes;
    generating an effectiveness metric associated with each of a plurality of filters available in an offering filter user interface based upon a transaction history associated with the plurality of offerings, wherein a filter comprises at least one of the attributes and the effectiveness metric is based on at least one of a probability that a filter was active in association with a purchase of an offering or a number of purchases that can be linked with the filter;
    weighting each of the plurality of filters based at least in part upon the effectiveness metric; and
    incorporating one of the filters into an offering filter user interface based upon the effectiveness metric and a user profile associated with a user linked with a request to generate the offering filter user interface, the offering filter user interface configured to render at least one of an indication that the filter has been applied, or an indication that the filter has not been applied to filter the plurality of offerings, the offering filter user interface further configured to render a second indication that a different filter associated with at least one of shipping terms, sales, or value added taxes has not been applied to filter the plurality of offerings.

2. The method of claim 1, further comprising:
    generating a new filter based at least in part upon an information gain analysis of one of the plurality of attributes and the transaction history, the analysis analyzing an information gain of the one of the plurality of attributes in offerings that were purchased against offerings that were unpurchased.

3. The method of claim 2, wherein the new filter comprises a combination of at least two of the plurality of attributes.

4. The method of claim 1, wherein incorporating one of the filters into the offering filter user interface based upon the effectiveness metric and the user profile further comprises selecting the one of the filters in response to a determination that the filter is associated with an attribute that is also associated with a previous transaction associated with the user profile.

5. A method comprising:
    identifying a plurality of offerings associated with an item, the offerings associated with a plurality of attributes;
    generating, based upon the plurality of attributes, a filter associated with the item, the filter comprising at least one of the attributes;
    generating an effectiveness metric associated with the filter based upon a plurality of previous transactions associated with the item;
    determining whether the effectiveness metric meets a predefined threshold; and
    incorporating the filter into an offering filter user interface when the effectiveness metric meets the predefined threshold, the offering filter user interface configured to render at least one of an indication that the filter has been applied, or an indication that the filter has not been applied to filter the plurality of offerings, the offering filter user interface further configured to render a second indication that a different filter associated with at least one of shipping terms, sales, or value added taxes has not been applied to filter the plurality of offerings.

6. The method of claim 5, wherein incorporating the filter into the offering filter user interface is performed in response to a quantity of filters in the offering filter user interface being below a quantity threshold.

7. The method of claim 5, wherein generating the effectiveness metric further comprises calculating a Bayesian probability of the at least one of the attributes of the filter being associated with a transaction associated with an offering of the item.

8. The method of claim 7, wherein the Bayesian probability is based at least in part upon a first probability that the offering was associated with the transaction when the filter was active in the offering filter user interface and a second probability that the filter was active in the offering filter user interface.

9. The method of claim 8, wherein the Bayesian probability is further based at least in part upon a third probability of the offering being purchased.

10. The method of claim 5, wherein generating the effectiveness metric further comprises generating a transaction count that can be linked with the filter with respect to the plurality of transactions.

11. The method of claim 5, wherein incorporating the filter into an offering filter user interface is performed in response to the at least one attribute of the filter matching an attribute in a transaction history of a user associated with a request to generate the offering filter user interface.

12. The method of claim 5, wherein incorporating the filter into an offering filter user interface further comprises selecting from among a plurality of filters, wherein each of the plurality of filters is weighted based upon a respective effectiveness metric.

13. The method of claim 12, wherein incorporating the filter into an offering filter user interface further comprises selecting one of the plurality of filters having a highest effectiveness metric.

14. The method of claim 5, wherein generating the filter is based at least in part upon an information gain analysis of one of the plurality of attributes and the plurality of previous transactions, the information gain analysis analyzing an information gain of the one of the plurality of attributes in offerings that were purchased against offerings that were unpurchased.

15. The method of claim 5, wherein generating the filter is based at least in part upon a number of transactions in the plurality of previous transactions that are associated with the at least one of the attributes.

16. The method of claim 5, wherein the filter comprises a combination of at least two of the attributes.

17. A system comprising:
at least one computing device; and
a filter application executable by the at least one computing device, the filter application, when executed, configured to cause the at least one computing device to at least:
identify a plurality of offerings associated with an item, the offerings associated with a plurality of attributes;
generate, based upon the plurality of attributes, a filter associated with the item, the filter comprising at least one of the attributes;
generate an effectiveness metric associated with the filter based upon a plurality of previous transactions associated with the item;
determine whether the effectiveness metric meets a predefined threshold; and
incorporate the filter into an offering filter user interface when the effectiveness metric meets the predefined threshold, the offering filter user interface configured to render at least one of an indication that the filter has been applied, or an indication that the filter has not been applied to filter the plurality of offerings, the offering filter user interface further configured to render a second indication that a different filter associated with at least one of shipping terms, sales, or value added taxes has not been applied to filter the plurality of offerings.

18. The system of claim 17, wherein incorporating the filter into the offering filter user interface is performed in response to a quantity of filters in the offering filter user interface being below a quantity threshold.

19. The system of claim 17, wherein generating the effectiveness metric further comprises generating a transaction count that can be linked with the filter with respect to the plurality of transactions.

20. The system of claim 17, wherein incorporating the filter into an offering filter user interface is performed in response to the at least one attribute of the filter matching an attribute in a transaction history of a user associated with a request to generate the offering filter user interface.

21. The system of claim 17, wherein generating the filter is based at least in part upon an information gain analysis of one of the plurality of attributes and the plurality of previous transactions, the information gain analysis analyzing an information gain of the one of the plurality of attributes in offerings that were purchased against offerings that were unpurchased.

* * * * *